United States Patent [19]

Strong

[11] Patent Number: 5,490,481

[45] Date of Patent: Feb. 13, 1996

[54] AQUARIUM

[75] Inventor: Finn A. Strong, Newport, R.I.

[73] Assignee: Finn Strong Designs, Inc., North Kingstown, R.I.

[21] Appl. No.: 340,628

[22] Filed: Nov. 16, 1994

[51] Int. Cl.$^6$ ............................................. A01K 63/00
[52] U.S. Cl. ............................................. 119/259
[58] Field of Search ........................ 119/245–248, 261, 119/265, 266, 267, 269, 15, 17

[56] References Cited

U.S. PATENT DOCUMENTS

| | | | |
|---|---|---|---|
| 2,732,341 | 1/1956 | Huff | 119/261 X |
| 3,857,366 | 12/1974 | Willinger | 119/266 |
| 4,988,436 | 1/1991 | Cole | 119/261 X |
| 5,005,521 | 4/1991 | Strong . | |
| 5,066,394 | 11/1991 | Harrison | 119/261 X |
| 5,083,528 | 1/1992 | Strong . | |
| 5,220,881 | 6/1993 | Sandor, Jr. | 119/265 |
| 5,255,811 | 10/1993 | Simon | 119/265 |
| 5,307,762 | 5/1994 | Englert | 119/266 |

*Primary Examiner*—Thomas Price
*Attorney, Agent, or Firm*—Salter & Michaelson

[57] ABSTRACT

An aquarium includes a tank having an interior region formed by a bottom and at least one wall extending up from the bottom. A cover, supported by the wall of the tank, substantially encloses the interior region of the tank. An intake port draws relatively cool, dry ambient air into the tank and an exhaust port exhausts relatively hot air from the tank. The exhaust port is elevated with respect to the intake port. The arrangement is such that hot air rises within the interior region and is exhausted from the interior region via the exhaust ports, which causes cool, dry air to be drawn into the tank through the intake port. The introduction of ambient air into the tank prevents the build-up of condensation on the wall of the tank. A lamp is mounted on the underside of the cover whereby the heat generated by the lamp exhausts through the exhaust port.

20 Claims, 5 Drawing Sheets

AQUARIUM

BACKGROUND AND SUMMARY OF THE INVENTION

This invention relates generally to aquariums and more particularly to an aquarium designed to prevent condensation from forming on the walls of the aquarium.

Typically, an aquarium is constructed to include a tank having a bottom and four transparent walls (e.g., glass or plastic) extending upwardly from the bottom. A cover is provided to enclose the interior of the tank and a lamp is mounted on the cover for illuminating the interior of the tank. One problem associated with this typical aquarium is that condensation forms on the walls of the tank due to the tank's inability to properly vent hot air from the interior of the tank. Condensation on the walls of the tank makes it difficult to view anything that is contained in the aquarium above the water level. Presently there is a need for an aquarium which is not susceptible to build-up of condensation on the walls of its tank.

Among the several objects of the present invention are the provision of an aquarium having a tank designed to reduce the amount of condensation on the walls of the tank; the provision of such an aquarium capable of continuously delivering fresh, clean water to an interior region of the tank; the provision of such an aquarium capable of filtering minerals and toxins from the water delivered to the tank; and the provision of such an aquarium which is simple in design and easy to manufacture.

In general, the aquarium of the present invention comprises a tank having an interior region formed by a bottom and at least one wall extending up from the bottom, the tank being adapted to contain water. A cover, supported by the wall of the tank, substantially encloses the interior region of the tank. An intake port draws relatively cool, dry ambient air into the tank and an exhaust port exhausts relatively hot, moist air resulting from the evaporation of water contained in the tank, from the tank. The exhaust port is elevated with respect to the intake port. The arrangement is such that hot, moist air rises within the interior region and is exhausted from the tank via the exhaust port creating a negative pressure within the tank, which causes cool, dry ambient air to be drawn into the tank through the intake port. This introduction of ambient air into the tank directed toward the inner surface of the viewing walls of the tank prevents the build-up of condensation on the wall of the tank.

Another aspect of the present invention is that of an aquarium having a water delivery system for slowly delivering water to the interior region of the tank. The water delivery system comprises a reservoir formed in the top surface of the cover and an outlet formed in the cover within the reservoir. A filter is provided for filtering minerals and toxins out of the water, the filter comprising an elongate tube and a filter medium provided within the tube. The cover includes a series of upwardly-extending walls, each wall having a downwardly-opening recess forming part of the bottom surface of the cover for increasing the radiation surface of the bottom surface of the cover to maximize condensation on the bottom surface.

Other objects, features and advantages of the invention shall become apparent as the description thereof proceeds when considered in connection with the accompanying illustrative drawings.

DESCRIPTION OF THE DRAWINGS

Corresponding references designate corresponding parts throughout the several views of the drawings.

DETAILED DESCRIPTION OF THE PREFERRED EMBODIMENT

Figure 1:
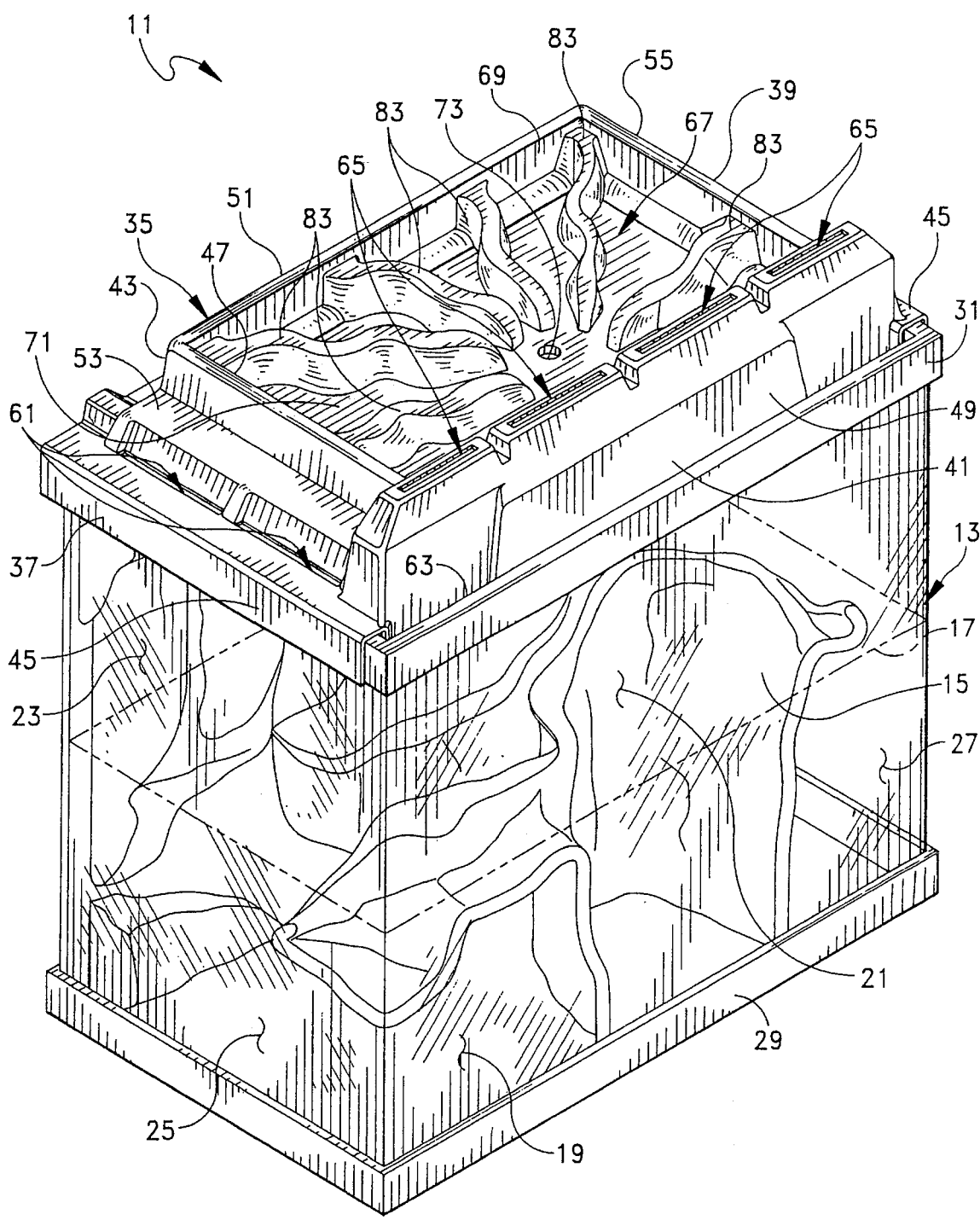
FIG. 1 is a perspective view of an aquarium of the present invention.

Referring to the drawings, and more particularly to FIG. 1, there is generally indicated at 11 an aquarium of the present invention. As shown, the aquarium 11 comprises a rectangular tank generally indicated at 13 having an interior region 15 for containing water 17. The tank 13 has a rectangular bottom 19, two side walls 21, 23 extending upwardly from the bottom and two shorter end walls 25, 27 also extending upwardly from the bottom. The bottom 19, side walls 21, 23, and end walls 25, 27 of the tank 13 are sealingly attached by any suitable means, such as a suitable adhesive (not shown) attaching the bottom and walls to a rigid frame 29. Another rigid frame 31 may also be provided for stabilizing the upper portions of the tank (i.e., the upper ends of side walls 21, 23 and end walls 25, 27). Preferably, the side walls 21, 23 and end walls 25, 27 of the tank 13 are made from transparent material, such as glass or rigid, clear plastic. The frames 29, 31 may be fabricated from any rigid material such as metal or rigid plastic. It is to be understood that the tank 13 may be constructed of many materials in any number of shapes and sizes (e.g., square, polygonal or circular) and still fall within the scope of the present invention.

Figure 2:
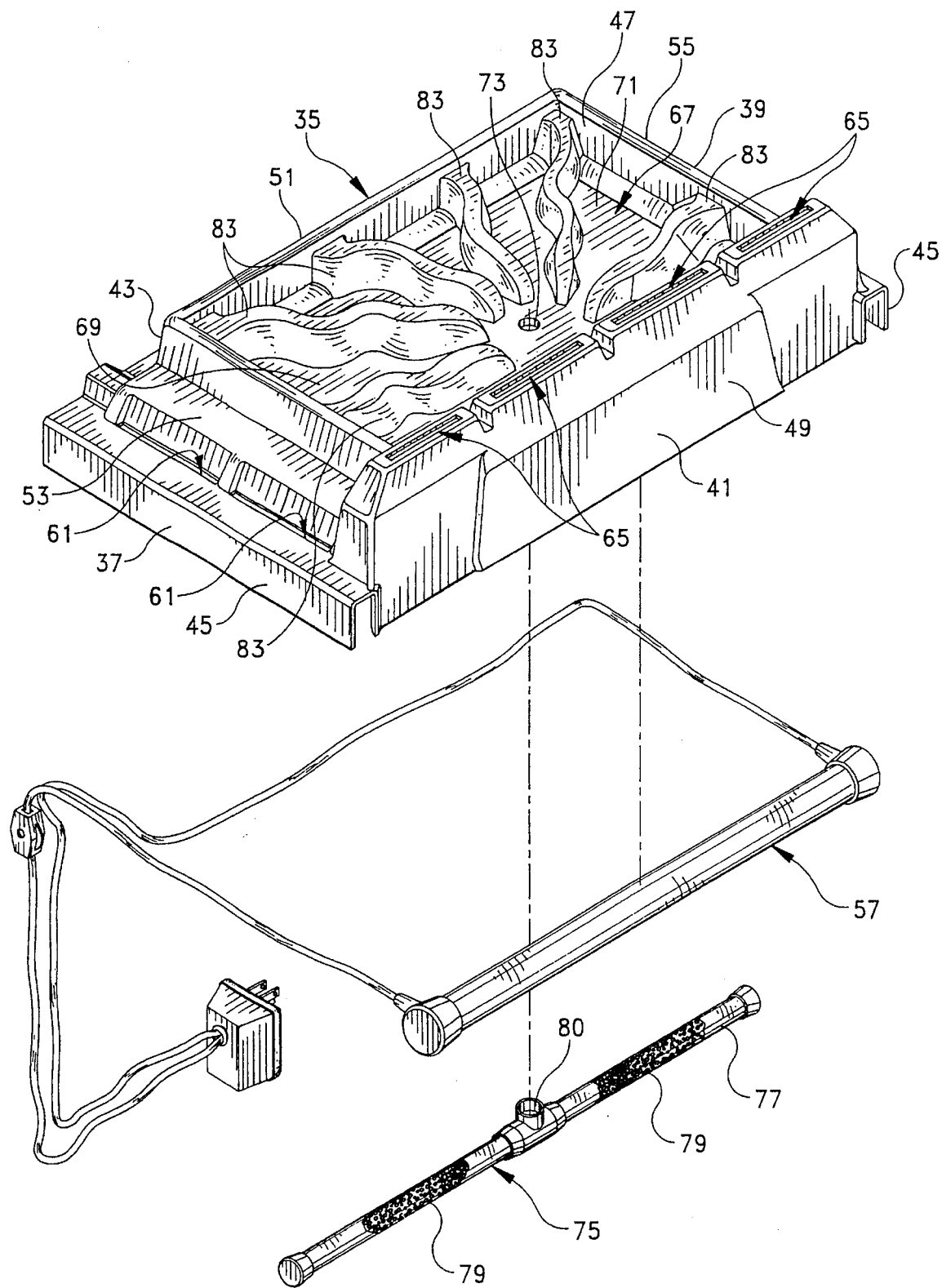
FIG. 2 is an exploded perspective view of a cover, a lamp and a filter of the aquarium illustrated in FIG. 1.

A cover, generally indicated at 35, is supported by the end walls 25, 27 and side wall 23 of the tank 13. The cover 35 may be made from transparent, translucent or opaque material, such as injection molded plastic. The cover substantially encloses the interior region 15 of the tank 13 for protecting marine life within the tank. As shown in FIGS. 1 and 2, the cover 35 is rectangular-shaped, having two shorter ends 37, 39 adapted to engage respective upper portions of the end walls 25, 27 of the tank 13 for supporting the cover 35 on the tank, and two longer sides 41, 43. When the cover 35 is mounted on the tank, the lower end of side 41 is disposed interiorly with respect to side wall 21 of the tank 13 and side 43 has a downwardly depending lip 45 (see FIG. 5) extending over the top edge of side wall 23. Each end 37, 39 of the cover also has a downwardly depending lip 45 which extends over the top edge of its respective end wall (25 or 27). The lips 45 suspend the cover 35 above the interior region 15 of the tank 13. It should be understood that the lips may extend completely around the upper edges of the tank 13 over side walls 21, 23 and still fall within the scope of the present invention.

Figure 3:
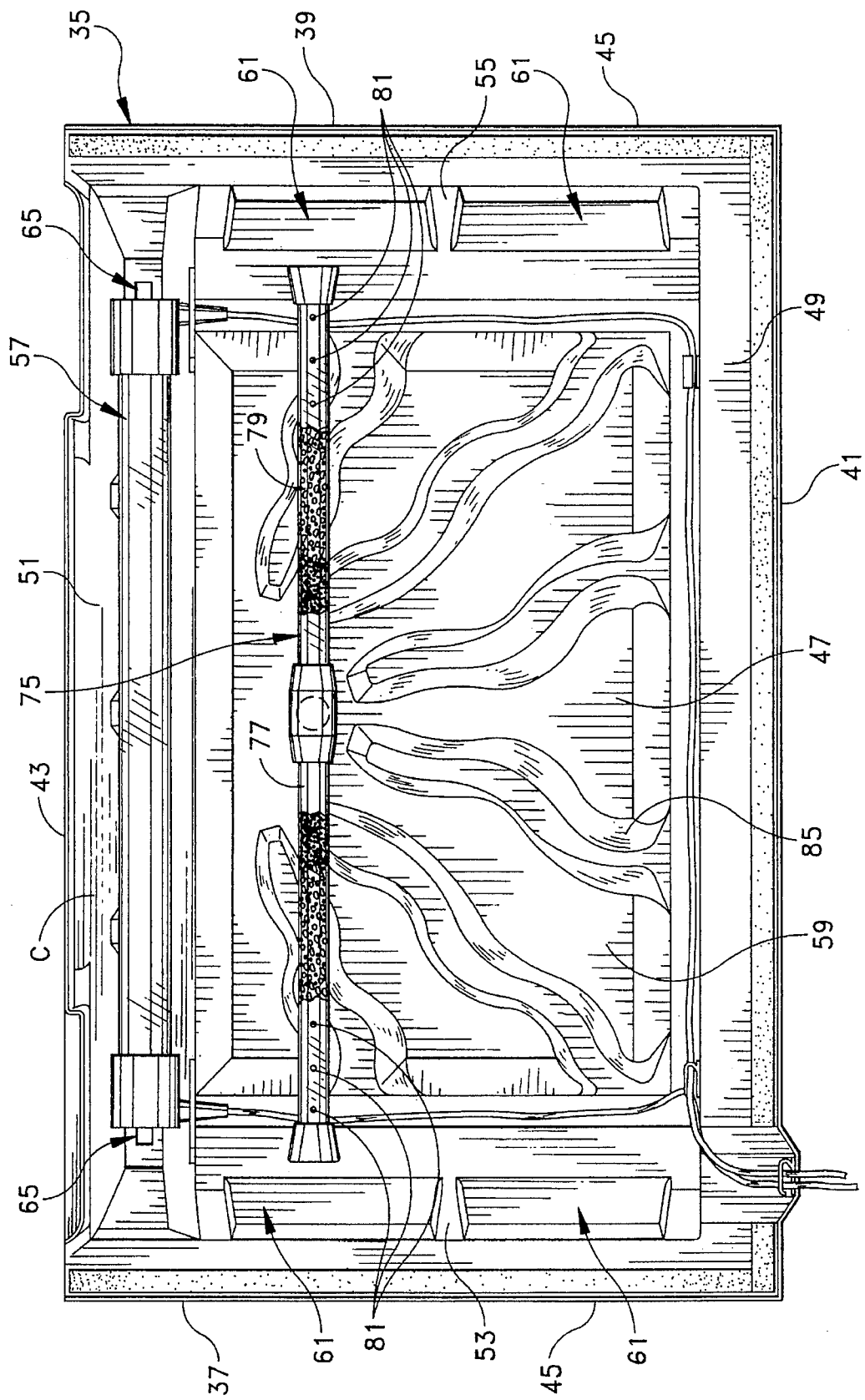
FIG. 3 is a bottom plan view of the cover with the lamp and filter mounted thereon.
Figure 5:
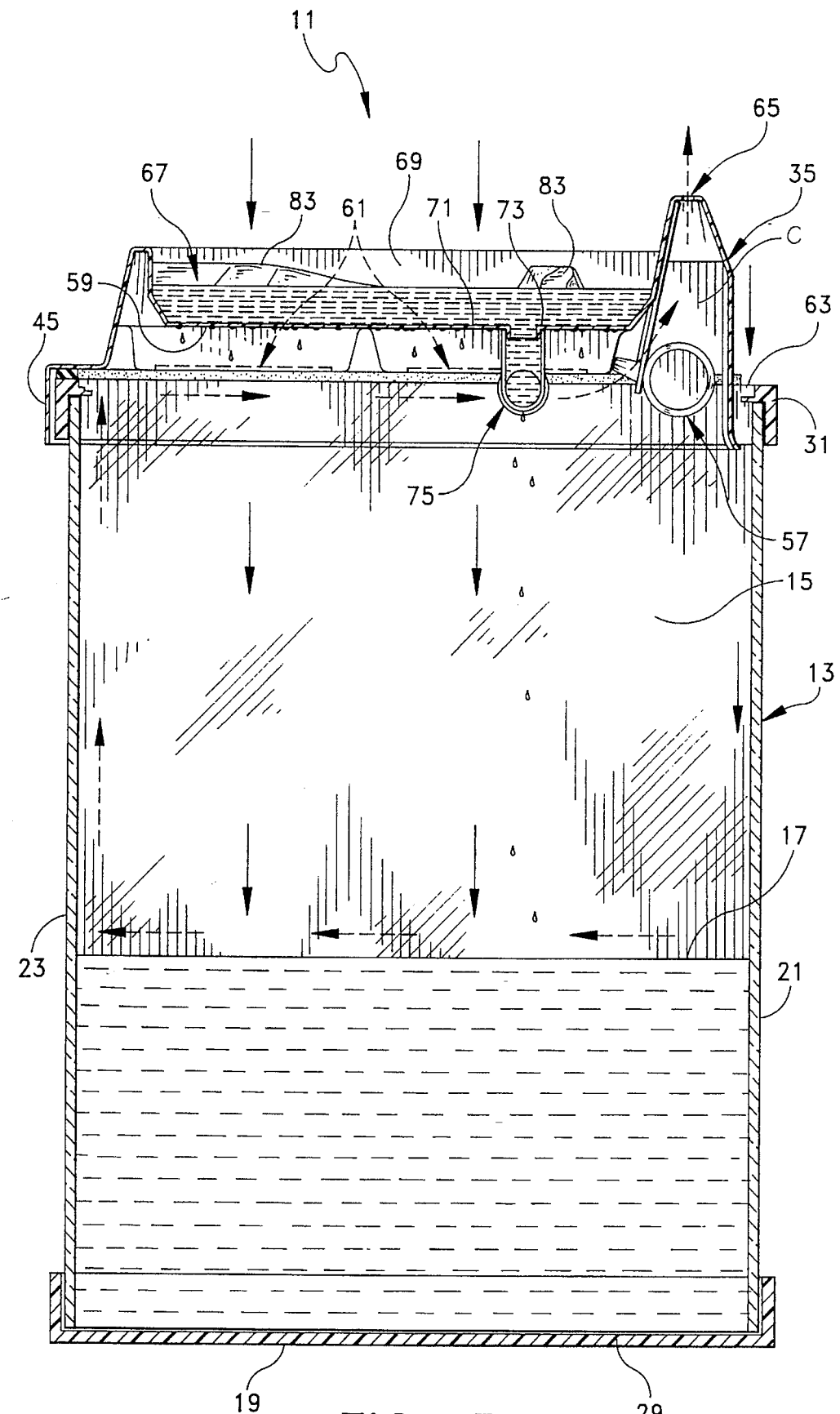
FIG. 5 is an end elevation cross-sectional view of the aquarium illustrated in FIG. 4.

The cover 35 also includes a raised interior portion 47 defined by four upwardly inclined walls (two side walls 49, 51 and two end walls 53, 55). Referring to FIGS. 3 and 5, an elongated, downwardly-opening cavity C is formed along side wall 49. A lamp, generally designated 57, is mounted adjacent to the lower end of cavity C (see FIG. 5) for illuminating the interior region 15 of the tank. The lamp 57 may be a fluorescent lamp, for example, however, other lamps could also be used, such as incandescent lamps. The lamp is activated by any suitable means, such as the electrical connections illustrated in FIG. 2.

As best illustrated in FIG. 3, there are four intake ports (each generally designated 61) formed in the cover 35 for drawing relatively cool, dry ambient air into the tank 13 along the end walls 25, 27 of the tank. As shown, there are two intake ports 61 formed in the cover 35 at one end of the cover which are adjacent to the upper portion of end wall 25 of the tank and two intake ports 61 formed in the cover 35 at the other end of the cover which are adjacent to the upper portion of end wall 27. The intake ports 61 are located along a horizontal plane which is generally parallel to the horizontal plane of the upper edges of the end walls 25, 27. Each intake port 61 is a rectangular-shaped slot large enough to adequately supply the interior region 15 of the tank 13 with ambient air. The intake ports 61 are formed in the cover 35 at the base of each upwardly inclined end wall 53, 55 of the cover. A gap 63 (FIG. 5) between the side wall 49 of the cover 35 and the tank side wall 21 also functions as an intake port which allows air to be drawn therein along side wall 21 of the tank 13. In the embodiment where the lip 45 extends completely around the upper edges of the tank 13, intake ports constructed similarly to ports 61 may be provided along the bottom of the side walls 49, 51 of the cover 35.

The present invention is based upon the principle that hot air has a tendency to rise to the highest point within the interior region 15 of the aquarium 11 and by venting the hot air from the aquarium at its highest point within its interior region, the resulting pressure drop within the aquarium will cause cool, dry ambient air to flow into the aquarium via intake ports 61 and through gap 63 which are located below the exhaust vent 65. As illustrated in the drawings, the highest point within the interior region 15 of the aquarium is above the lamp 57 within cavity C, i.e., at the upper end of cavity C as viewed in FIG. 5. Accordingly, four exhaust ports, each generally indicated at 65, are formed in the cover 35 at the upper end of cavity C for exhausting relatively hot air from the tank pursuant to heat from the light and/or other sources. As shown, the exhaust ports 65 are relatively narrow rectangular-shaped slots formed in-line in the cover 35 directly above the location of the lamp 57. As mentioned above, important aspect of the present invention is that the exhaust ports 65 are elevated with respect to the intake ports 61 (including gap 63). This arrangement creates a vacuum within the interior region 15 of the tank 13 since hot air is exhausted from the tank 13 at the highest point within the tank through the exhaust ports 65, thereby creating a pressure drop wherein cool, dry ambient air is drawn into the tank 13 along the side wall 21 and end walls 25, 27 of the tank 13 through the intake ports 61 (and gap 63) located below the exhaust ports 65. The introduction of ambient air into the tank 13 which flows along side wall 23 and end walls 25, 27 prevents condensation from forming on the side and end walls.

It is to be understood that the intake ports 61 and the exhaust ports 65 may be provided at any location on the aquarium 11 (e.g., in the tank, cover, gaps between the tank and cover) as long as the exhaust ports are located above the intake ports so that the hot air which has risen to the highest point within the aquarium may be vented, thereby creating the aforementioned pressure drop which causes ambient air to be drawn through the intake ports and directed toward the inner surface of the viewing walls.

Generally indicated at 67 is a water delivery system for delivering fresh, clean water to the interior region 15 of the tank 13. The water delivery system 67 of the present invention is especially suited for delivering filtered water slowly to the interior region 15 of the tank 13. The water delivery system 67 includes a reservoir 69 formed in the top surface 71 of the cover 35 in the raised interior portion 47 thereof. An outlet 73 formed in the cover 35 within the reservoir 69 is provided for delivery of water from the reservoir 69 to the interior region 15 of the tank 13. Water flows from the reservoir 69, through the outlet 73, and to a filter, generally indicated 75, comprising an elongate tube 77 (FIGS. 2 and 3) mounted to the bottom surface 59 of the cover 35. The filter 75 includes a filter medium 79 of charcoal ion exchange resin and filter fiber inside the tube 77 for filtering minerals and toxins out of the water passing therethrough. As illustrated in FIG. 2, the filter tube 77 has closed ends and an upwardly facing opening 80 formed in a neck which is located at the mid-way point of the tube. The tube 77 is mounted to the bottom surface 59 of the cover 35 in any suitable manner in a position where the opening 80 of the tube is in communication with the outlet 73 of the cover 35. A plurality of small openings 81 are formed in the underside of the tube 77 adjacent to the end portions thereof (see FIG. 3) for slowly delivering filtered water from the reservoir 69 to the interior region 15 of the tank 13. It is envisioned that the filter tube 77 could embody any number of configurations and still fall within the scope of the present invention. For example, a solid filter tube (i.e., without openings 81) with open ends could be provided for delivering filtered water to the interior region 15 of the tank 13 in lieu of tube 77.

The reservoir 69 has a series of upwardly extending walls, each indicated 83, formed in the cover 35 and positioned within the reservoir 69 for increasing the radiation surface of the bottom surface 59 of the cover 35 thereby maximizing condensation on the bottom surface 59 of the cover 35. As shown, there are six undulating walls 83 formed in the cover which extend radially outwardly away from the outlet 73 of the reservoir 69. As viewed in FIG. 3, each wall defines has a downwardly-opening recess 85 formed in the cover, each recess forming part of bottom surface 59 and including an upper, generally horizontal but sloping surface extending downwardly for increasing the surface area of the bottom surface 59. FIG. 5 illustrates water condensing on the bottom surface 59 of the cover 35 which is reintroduced to the water 17 contained in the tank. Since the walls 83 increase the surface area of the bottom surface 59 of the cover 35 and thus the amount of condensation which builds up is maximized on the bottom surface 59 and is eventually reintroduced into water 17.

Figure 4:
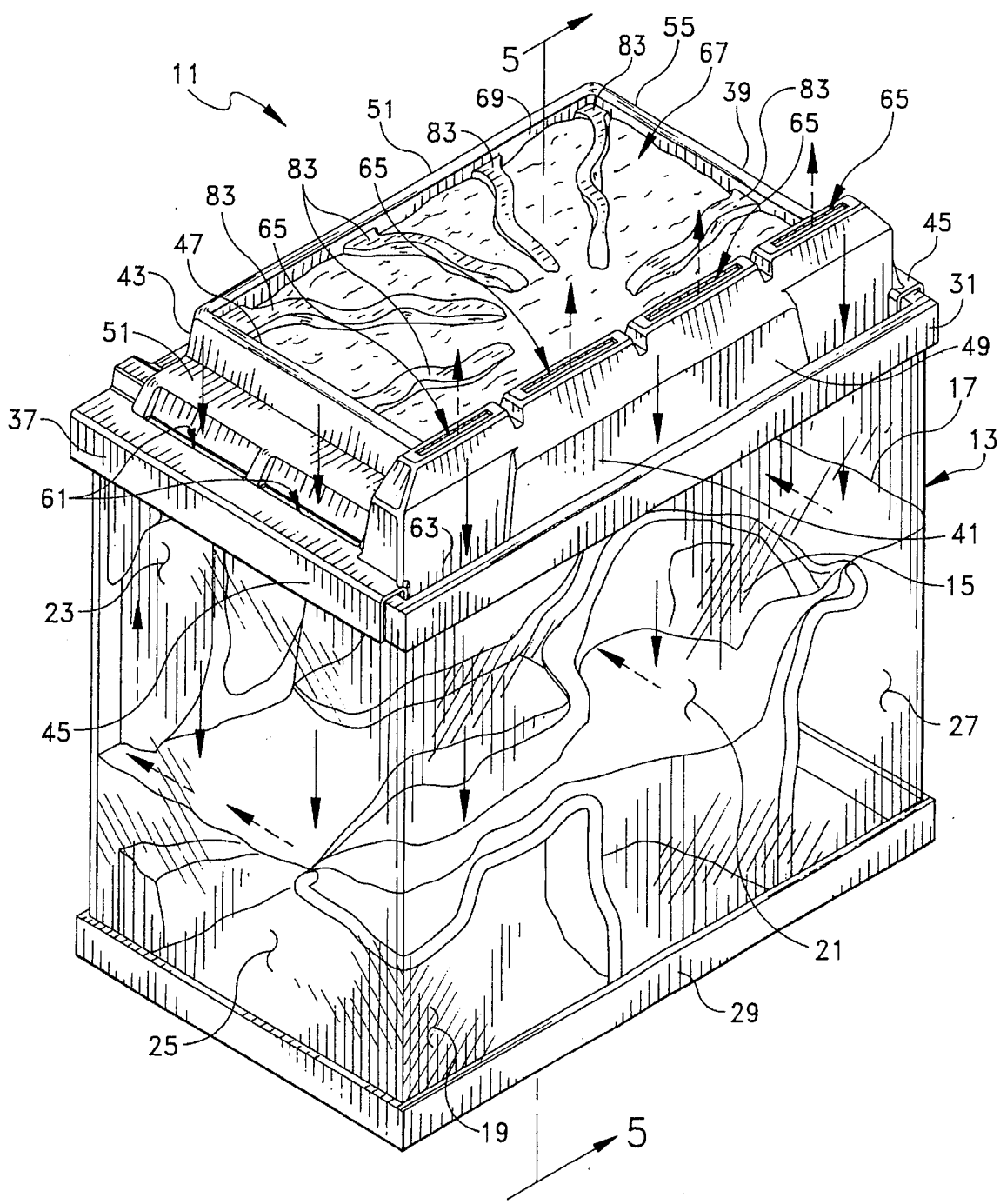
FIG. 4 is a perspective view of the aquarium illustrating air flow patterns within an interior region of a tank of the aquarium.

FIGS. 4 and 5 illustrate the flow of air within the aquarium 11. Dashed arrows show air flowing along the surface of the water 17 in the tank, and due to the evaporation of water 17 in the tank 13, the cool, dry air introduced into the tank via the intake ports 61 is heated and moistened so that hot air results. This hot air flows along side wall 23 and rises into the walls 83 and comes into contact with the cool surface of the wall causing condensation. The wall 83 is cooled by the outside temperature or by the water in the reservoir 69. The air then flows to the highest location within the interior region 15 of the aquarium (i.e., within cavity C of the cover 35) above the location of the intake ports 61 (as illustrated by dashed arrows in FIG. 5) and is exhausted through the exhaust ports 65. As mentioned above, this results in a pressure drop within the aquarium whereby cool, dry ambient air is drawn into the tank via intake ports 61. Solid arrows illustrate ambient air being drawn through the intake ports 61 and flowing downwardly along the side wall 21 and end walls 25, 27 of the tank 13, thereby preventing condensation from forming on the side and end walls.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An aquarium comprising:
   a tank having an interior region formed by a bottom and at least one wall extending up from the bottom, said tank being adapted to contain water;
   a cover supported by the wall of the tank, said cover substantially enclosing the interior region of the tank;
   an intake port formed in the cover for drawing relatively cool, dry ambient air into the tank; and
   an exhaust port formed in the cover for exhausting relatively hot air from the tank, said exhaust port being elevated with respect to said intake port and in fluid communication with the intake port and the interior region of the tank, the arrangement being such that hot air rises within the interior region of the tank and is exhausted from the interior region via the exhaust port, thereby causing cool, dry ambient air to be drawn into the tank through said intake port, the introduction of ambient air into the tank preventing the build-up of condensation on the wall of the tank.

2. An aquarium as set forth in claim 1 comprising a plurality of intake ports and a plurality of exhaust ports formed in the cover, said exhaust ports each being elevated with respect to said intake ports.

3. An aquarium as set forth in claim 2 wherein said intake port is formed in the cover adjacent to an upper portion of the wall of the tank for drawing air along the wall of the tank within the interior region of the tank.

4. An aquarium as set forth in claim 1 further comprising a water delivery system for delivering water to the interior region of the tank, said water delivery system being adapted to slowly deliver water to the interior region of the tank.

5. An aquarium as set forth in claim 4 wherein said cover has a top surface and a bottom surface, and wherein said water delivery system comprises a reservoir formed in said top surface, and an outlet formed in the cover within the reservoir for delivering water from the reservoir to the interior region of the tank.

6. An aquarium as set forth in claim 5 wherein said water delivery system further comprises a filter for filtering minerals and toxins out of the water passing through said opening in the cover.

7. An aquarium as set forth in claim 6 wherein said filter comprises an elongate tube mounted to the bottom surface of the cover and a filter medium provided within the tube, said tube having an opening in communication with said outlet in the cover.

8. An aquarium as set forth in claim 5 wherein said cover reservoir includes a series of upwardly extending walls, each wall having a downwardly-opening recess forming part of the bottom surface of the cover for increasing the radiation surface of the bottom surface of the cover to maximize condensation on said bottom surface.

9. An aquarium as set forth in claim 1 further comprising a lamp for illuminating the inside of the tank, whereby heat from said lamp rises adjacent the exhaust port for creating a vacuum to draw cool air into the tank via the intake port.

10. An aquarium as set forth in claim 9 wherein said cover has an top surface and a bottom surface, and wherein said lamp is mounted on the bottom surface of the cover.

11. A cover for a tank having an interior region for containing water which is formed by a bottom and at least one wall extending up from the bottom, said wall being adapted to support the cover for enclosing the interior region of the tank said cover comprising:
    an intake port formed in the cover for drawing relatively cool, dry ambient air into the tank; and
    an exhaust port formed in the cover for exhausting relatively hot air from the tank, said exhaust port being elevated with respect to said intake port and in fluid communication with the intake port and the interior region of the tank, the arrangement being such that hot air rises within the interior region of the tank and is exhausted from the interior region via the exhaust port, thereby causing cool, dry ambient air to be drawn into the tank through the intake port, the introduction of ambient air through the intake port of the cover preventing the build-up of condensation on the wall of the tank.

12. A cover as set forth in claim 11 comprising a plurality of intake ports and a plurality of exhaust ports each being elevated with respect to the intake ports.

13. A cover as set forth in claim 11, said intake port being formed adjacent its outer periphery for drawing air along the wall of the tank within the interior region of the tank.

14. A cover as set forth in claim 11 further comprising a water delivery system for slowly delivering water to the interior region of the tank.

15. A cover as set forth in claim 14 comprising a top surface and a bottom surface, said water delivery system comprising a reservoir formed in said top surface, and an outlet formed in the cover within the reservoir.

16. A cover as set forth in claim 15, said water delivery system further comprising a filter for filtering minerals and toxins out of the water passing through said opening in the cover.

17. A cover as set forth in claim 16, said filter comprising an elongate tube mounted on the bottom surface of the cover and a filter medium provided within the tube, said tube having an opening in communication with said outlet in the cover.

18. A cover as set forth in claim 15, said reservoir comprising a series of upwardly extending walls, each wall having a downwardly-opening recess forming part of the bottom surface of the cover for increasing the radiation surface of the bottom surface of the cover to maximize condensation on said bottom surface.

19. A cover set forth in claim 11 further comprising a lamp for illuminating the inside of the tank, whereby heat from said lamp rises adjacent the exhaust port for creating a vacuum to draw cool air into the tank via the intake port.

20. A cover as set forth in claim 19 comprising a top surface and a bottom surface, said lamp being mounted on the bottom surface of the cover.

* * * * *